United States Patent [19]

Hauber

[11] Patent Number: 5,318,843
[45] Date of Patent: Jun. 7, 1994

[54] HEAT-SEALING ADHESIVE

[75] Inventor: Rudiger Hauber, Buckeburg, Fed. Rep. of Germany

[73] Assignee: Hans Neschen GmbH & Co. KG, Buckeburg, Fed. Rep. of Germany

[21] Appl. No.: 5,363

[22] Filed: Jan. 19, 1993

[30] Foreign Application Priority Data

Jan. 25, 1992 [DE] Fed. Rep. of Germany ....... 4202070

[51] Int. Cl.$^5$ .............................................. C09J 7/02
[52] U.S. Cl. .................................. 428/349; 428/355; 525/307
[58] Field of Search ............... 428/349, 355; 525/307, 525/240, 221, 231

[56] References Cited

U.S. PATENT DOCUMENTS

| | | | |
|---|---|---|---|
| 4,152,189 | 5/1979 | Guerin | 428/349 |
| 4,395,525 | 7/1983 | Fischer | 428/349 |
| 4,569,877 | 2/1986 | Tollefson | 428/349 |
| 4,880,683 | 11/1989 | Stow | 428/349 |
| 5,073,452 | 12/1991 | Satou | 428/349 |

Primary Examiner—Jenna L. Davis
Attorney, Agent, or Firm—Nixon & Vanderhye

[57] ABSTRACT

The invention relates to a heat-sealing adhesive, which comprises a mixture of:

a) 20-60% by weight of nonadhesive (meth)acrylic acid ester-(meth)acrylic acid copolymers, which contain (meth)acrylic acid ester units with 2-8 carbon atoms in the alcohol component and, relative to these copolymers, 1-10% by weight of (meth)acrylic acid, with a melting temperature in the range of 115 to 150 and a K value according to Fikentscher in the range of 70 to 110 (measured according to DIN 51562 in tetrahydrofuran), b) 10-50% by weight of self-adhesive acrylic acid ester-acrylic acid copolymers, which contain acrylic acid ester units with 2-8 carbon atoms in the alcohol component and, relative to these copolymers, 1-10% by weight of acrylic acid, with a glass transition temperature $T_G$ in the range of $-45°$ to $-10°$ C., a K value according to Fikentscher in the range of 70 to 120 (measured according to DIN 51562 in tetrahydrofuran) and a softening temperature in the range of 50° to 100° C., and c) 10-50% by weight of polyethylene with an average molecular weight of 1000-10000 as well as optionally usual additives.

It is suitable for the production of paper heat-sealing adhesive tapes, which can be used for restoration and preservation of paper substrates.

18 Claims, No Drawings

HEAT-SEALING ADHESIVE

The invention relates to a heat-sealing adhesive, a heat-sealing adhesive tape produced with its use and its use for restoring and preserving paper substrates. The heat-sealing adhesive tape in particular is a heat-sealing adhesive tape which comprises a carrier coated on one side with the heat-sealing adhesive.

In large and small libraries and archives, old books, newspapers, documents, maps, charts and other records consisting of paper are often stored, which over time have partially disintegrated or have been damaged in some form and therefore have to be restored or preserved.

A paper contact adhesive tape is described in EP 84730045 which is used to repair torn pages of frequently used books or to envelop entire surfaces of the sheets. With such a paper contact adhesive tape, individual pages can also be combined to book signatures for the sewing, to mend damaged edges of documents or to reinforce book joints inside with strips.

For restoration work on paper substrates, first of all adhesive tapes with paper carriers are suitable, and the art of the papermaker is to find the correct mixture of various types of pulp to produce lightweight papers with the desired properties.

In contrast, film carriers are not advisable since they have unfavorable aging properties. For restoration work, for example, polyethylene sheets of 30 μm thickness can be used which are sealed between the paper to be repaired and a transparent tissue paper for reinforcement. But the adhesive power of heat-sealed polyethylene is not very great, so that the seal can be slowly mechanically detached if the fibers of the papers exhibit sufficient adhesion. Further, relative to light rays and heat, polyethylene is not very resistant to aging and more easily fragmented than, e.g., acrylic acid ester-acrylic acid-copolymers.

The adhesive of a heat-sealing adhesive tape has to meet special requirements. A contact adhesive, which is soluble in water, is described in EP 84730045. If the tape equipped and bonded with it is to be removed again from the book page without damage, the bonded area is to be soaked for several minutes in water so that the adhesive can swell and redisperse. The drawback connected with this adhesive lies in the fact that with soaking in water, the paper could be damaged and/or water-soluble writing inks or printing inks could be dissolved. Other dispersible or water-soluble contact adhesives, as they are described in patents DE 22 14 293, DE 22 36 575, DE 29 04 233, U.S. Pat. No. 3,096,202 and U.S. Pat. No. 3,661,874, become discolored during the aging, their fat penetrates the papers or they exhibit the same drawbacks in paper restorations as they are described above.

Heat-sealing adhesives based on ethylene-propylene copolymers, ethylene-vinyl acetate copolymers and polyterpene resins as tackifiers are indicated in patents DE 19 63 716 and U.S. Pat. No. 3,922,435. Patents DE 17 19 099 and EP 0 009 937 describe heat-sealing adhesives based on styrene-butadiene copolymers, which are mixed with polyacrylic resins, phthalic acid ester softeners, pine resins and polyvinyl pyrrolidone, as well as block copolymers based on copolyesters, copolyamides and copolyester amides, which are filled with aluminum powder and glass fibers. For example, heat-sealing adhesives made of copolymers of vinyl acetate-ethylene, vinyl acetate-acrylic acid ester, vinyl acetate-maleic acid-di-n-butyl ester and vinyl acetate-vinyl laurate are commercially available.

All cited heat-sealing adhesives are not suitable for paper restorations since they exhibit either insufficient colorless transparency and gradually become discolored during the aging over many years or the adhesion is only slight so that the seal between the papers dissolves when the material is frequently folded or is mechanically stressed in another way.

Therefore the object of the invention is to develop a heat-sealing adhesive and a heat-sealing adhesive tape equipped with it. The heat-sealing adhesive is to cause a high bonding strength, be very resistant to aging and for years show no discolorations after bonding. It is to be relatively easily and quickly removable by heating and in this case remain adhered to the respective heat-sealing adhesive tape to be removed, without the bonded paper substrate being damaged or noticeable adhesive tape residues being left behind on it.

This object is achieved by a heat-sealing adhesive which comprises a mixture of:

a) 20-60% by weight of nonadhesive (meth)acrylic acid ester-(meth)acrylic acid copolymers, which contain (meth)acrylic acid ester units with 2-8 carbon atoms in the alcohol component and, relative to these copolymers, 1-10% by weight of (meth)acrylic acid, with a melting temperature in the range of 115 to 150 and a K value according to Fikentscher in the range of 70 to 110 (measured according to DIN 51562 in tetrahydrofuran), b) 10-50% by weight of self-adhesive acrylic acid ester acrylic acid copolymers, which contain acrylic acid ester units with 2-8 carbon atoms in the alcohol component and, relative to these copolymers, 1-10% by weight of acrylic acid, with a glass transition temperature $T_G$ in the range of $-45°$ to $-10°$ C., a K value according to Fikentscher in the range of 70 to 120 (measured according to DIN 51562 in tetrahydrofuran) and a softening temperature in the range of 50° to 100° C., and c) 10-50% by weight of polyethylene with an average molecular weight of 1000-10000 as well as optionally usual additives.

Preferred embodiments of the invention are the object of the subclaims.

The heat-sealing adhesive according to claim 1 is colorless, transparent and has a high adhesion and cohesion, so that the folding strength of the heat-sealing adhesive tape, which is coated with the heat-sealing adhesive according to the invention and is sealed with the paper substrate, is very good, and an undesirable detachment of the adhesive bond does not occur.

The excellent seal is attributable to the mixture according to the invention of high-molecular, varnish-like hard (meth)acrylic acid ester-(meth)acrylic acid copolymers with flexible acrylic acid ester-acrylic acid copolymers. The sealed connected components cannot be separated from one another at normal temperature without tearing or splitting. At temperatures starting from about 120° C., the adhesive tape together with the heat-sealing adhesive can be easily removed again.

Component a) of the heat-sealing adhesive according to the invention preferably exhibits a melting temperature in the range of 125° to 135° C. and a K value according to Fikentscher in the range of 80 to 100 (measured according to DIN 51562 in tetrahydrofuran). Component b) preferably exhibits a glass transition temperature $T_G$ in the range of $-35°$ to $-20°$ C., a K value according to Fikentscher in the range of 80 to 110 (measured according to DIN 51562 in tetrahydrofuran) and a softening temperature in the range of 60° to 90° C.

The polyethylene has two functions in the heat-sealing adhesive. On the one hand, it reduces the blocking tendency up to temperatures of about 50° C., on the other hand, it melts quickly when the sealing occurs and promotes the flow of the adhesive between the paper fibers, so that the fibers are well embedded, which leads to a greater transparency of the paper-adhesive bond and thus to an improved print definition of the sealed paper substrate. In the adhesive, branched and unbranched polyethylene can be mixed in primary or secondary dispersions. The polyethylene preferably exhibits an average molecular weight of 1000 to 10000, preferably 3000 to 6000, and its melting temperature lies in the range of 95° to 125° C., preferably 107° to 115° C.

As ester component in the (meth)acrylic acid ester-(meth)acrylic acid copolymers and the acrylic acid ester-acrylic acid copolymers, n-butyl acrylate and/or 2-ethylhexyl acrylate are suitable, which optionally also can be present simultaneously.

The copolymers contained in the heat-sealing adhesive can further contain other monomers, and (meth)acrylonitrile, vinyl acetate and styrene are preferred.

The polymer mixture according to the invention is dispersible in water. In the form of its aqueous dispersion, the heat-sealing adhesive can be especially well processed. In this case, it is preferred that the pH of the aqueous dispersion is adjusted with ammonia water to about 7.0 to 8, preferably 7.0 to 7.5.

It can further be suitable to add thickeners, wetting agents and defoaming agents in usual amounts to the dispersions. Also, salts such as magnesium carbonate and calcium carbonate can be added, which can neutralize acids, which possibly migrate from the paper substrates to the adhesive. Further, the heat-sealing adhesives can contain salts of o-phenylphenols having a bactericidal and fungicidal effect, which inhibit or exclude a growth of bacteria and fungi during the aging over many years.

It is preferable that the heat-sealing adhesive according to the invention further contains:

d) 1-5% by weight of magnesium or calcium carbonate, e) 0.1-1.0% by weight of alkali salts of o-phenylphenols and/or f) 0.2-1.0% by weight of defoaming agent.

Seals of various color printings, writing and stamp inks, which have been obtained with the help of the adhesive according to the invention, show no changes after four weeks of storage at up to 70° C. Bleeding or bleaching of the colors and inks cannot be detected and is possible only if the color pigments are mixed with substances able to migrate, such as, e.g., softeners.

As a tape carrier, especially paper is suitable, and aging-resistant types of paper such as Japanese tissues or technical papers with high transparency are to be preferred. In the case of the Japanese tissues, care must be taken that for restoration work, only grades are processed which maintain their bonding strength during the aging, do not become yellow and remain almost pH-neutral. Japanese tissues containing acid are not advisable for restorations and preservations since during the aging, they lose their durability with respect to tensile and folding strength and discolor yellow-brown.

The used restoration papers must not contain any lignin and should be as free as possible of hemicelluloses, since they otherwise yellow too easily. Papers which meet these demands exhibit a high portion of α-cellulose. To improve the paper strength, special fibers (e.g., Manila hemp) can be incorporated. Paper types which have a good tensile strength by a mat-like felting of relatively long fibers are also advantageous. In practice, it has proven suitable to use thin, transparent papers with a weight of about 7 to 30, especially 7 to 12 and preferably 8 to 10 g/m$^2$, as carrier material for the paper adhesive tape so that the adhesive tapes on the bonded papers are almost invisible.

The side of the paper carrier coated with the heat-sealing adhesive can further be covered with a siliconized release paper to simplify the processing.

Below, the invention is explained in more detail based on examples.

EXAMPLES 1 to 4

In the following table, four different formulation examples for the heat-sealing adhesives according to the invention are indicated. The % by weight of the formulations relate to 100% solids, i.e., without taking into consideration the water portions of the dispersion.

| | Example | | | |
|---|---|---|---|---|
| | 1 | 2 | 3 | 4 |
| (Meth)acrylic acid ester-(meth)acrylic acid-copolymer, melting temperature: 125-135° C., K value: 80-100 | 31.8 | 47.5 | 22.7 | 60.0 |
| Acrylic acid ester-acrylic acid-copolymer, $T_G$: $-20$ to $-40°$ C., K value: 80-110, softening temperature: 60-90° C. | 40.0 | 20.0 | 35.0 | 17.0 |
| Polyethylene, molecular weight: 3,000-6,000, melting temperature: 107-115° C. | 25.0 | 30.0 | 40.0 | 20.0 |
| Magnesium or calcium carbonate | 2.2 | 1.6 | 1.1 | 1.8 |
| Na-salt of o-phenyl-phenols | 0.4 | 0.3 | 0.6 | 0.6 |
| defoaming agent | 0.6 | 0.6 | 0.6 | 0.6 |

The heat-sealing dispersions are deposited on siliconized release papers or polyester sheets, dried and then laminated on Japanese tissues or technical special papers by a heating cylinder (weight of paper: 7 to 15 g/m$^2$, adhesive deposit dry; 7 to 25 g/m$^2$).

In practice, an endless release material tape is to be preferred for the transfer of the heat-sealing adhesive to tissue papers, since then the release material is eliminated as waste product. But release papers (67 to 120 g/m$^2$) deform with repeated aqueous coating and the lamination quality can be adversely affected by the surface roughness. Siliconized polyester sheets (50 to 75 μm thickness) must not be heated too greatly during the lamination, since they otherwise form many small folds. It depends on the skill of the machine operator to provide optimum laminating conditions.

Since transparent, thin tissue papers (about 8 g/m$^2$) exhibit very little strength and easily tear in the further processing, it is often more advantageous to manufacture the paper adhesive tape with releasing paper as an auxiliary carrier. The paper adhesive tape can be stored without release paper as rolls and as a stack of sheets, and a smallest possible winding or stacking pressure is advisable, and the storage temperature is to be at about 18° to 25° C. A storage up to at most 45° C. is possible for a short time. If pressing power and temperature are too high, the paper adhesive tape layers are blocked. If the paper adhesive tape is covered with silicone paper, there are no processing difficulties at higher pressure powers and temperatures. The paper adhesive tape is sealed with a heated press to materials to be restored, such as, e.g., newspapers, book pages, charts and other records consisting of paper (pressing conditions: pressure 9 kg/cm², temperature: about 120° C., time: 1 minute).

If the adhesive-free side of the paper adhesive tape is covered with the silicone film side of a siliconized paper, the surface of the paper tape after the sealing is shiny. The surface of the paper tape is dull, if in the sealing it is covered with a polyester screen.

I claim:
1. Heat-sealing adhesive, comprising a mixture of:
   a) 20-60% by weight of nonadhesive (meth)acrylic acid ester-(meth)acrylic acid copolymers, which contain (meth)acrylic acid ester units with 2-8 carbon atoms in the alcohol component and, relative to these copolymers, 1-10% by weight of (meth)acrylic acid, with a melting temperature in the range of 115° to 150° C. and a K value according to Fikentscher in the range of 70 to 110 measured according to DIN 51562 in tetrahydrofuran,
   b) 10-50% by weight of self-adhesive acrylic acid esteracrylic acid copolymers, which contain acrylic acid ester units with 2-8 carbon atoms in the alcohol component and, relative to these copolymers, 1-10% by weight of acrylic acid, with a glass transition temperature $T_G$ in the range of −45° to −10° C., a K value according to Fikentscher in the range of 70 to 120 measured according to DIN 51562 in tetrahydrofuran and a softening temperature in the range of 50° to 100° C., and
   c) 10-50% by weight of polyethylene with an average molecular weight of 1000-10000.

2. Heat-sealing adhesive according to claim 1, wherein component a) exhibits a melting temperature in the range of 125°-135° C. and a K value in the range of 80 to 100 and/or component b) exhibits a glass transition temperature $T_G$ in the range of −35° to −20° C., a K value in the range of 80 to 110 and a softening temperature in the range of 60°-90° C.

3. Heat-sealing adhesive according to claim 1, wherein the melting temperature of the polyethylene lies in the range of 95° to 125° C.

4. Heat-sealing adhesive according to claim 1, wherein the average molecular weight of the polyethylene is 3000 to 6000 and/or its melting temperature lies in the range of 107° to 115° C.

5. Heat-sealing adhesive according to claim 1, wherein the (meth)acrylic acid ester-(meth)acrylic acid copolymers and the acrylic acid ester-acrylic acid copolymers contain n-butyl acrylate and/or 2-ethylhexyl acrylate as ester component.

6. Heat-sealing adhesive according to claim 1, and further comprising an additive selected from the group consisting of a thickener, a wetting agent, a defoaming agent, magnesium carbonate, calcium carbonate, and an alkali salt of an o-phenylphenol.

7. Heat-sealing adhesive according to claim 6, wherein said additive is magnesium carbonate or calcium carbonate and is present in an amount of 1-5% by weight.

8. Heat-sealing adhesive according to claim 6, wherein said additive is an alkali salt of an 0-phenylphenol and is present in an amount of 0.5-1.0% by weight.

9. Heat-sealing adhesive according to claim 6, wherein said additive is a defoaming agent and is present in an amount of 0.2-1.0% by weight.

10. Heat-sealing adhesive according to claim 1, wherein other monomers are polymerized with the copolymers.

11. Heat-sealing adhesive according to claim 10, wherein said monomers are selected from the group consisting of (meth)acrylonitrile, vinyl acetate and styrene.

12. Heat-sealing adhesive according to claim 1, which has been deposited in the form of an aqueous dispersion on a carrier.

13. Heat-sealing adhesive according to claim 12, which has been deposited on the carrier in the form of an aqueous dispersion adjusted with ammonia water to a pH of about 7.0 to 8.

14. Heat-sealing adhesive according to claim 13, which has been deposited on the carrier in the form of an aqueous dispersion adjusted with ammonia water to a pH for about 7.0 to 7.5.

15. Paper heat-sealing adhesive tape, which comprises a paper carrier coated on one side with a heat-sealing adhesive according to one of claims 1 to 5 or 6 to 14.

16. Paper heat-sealing adhesive tape according to claim 15, wherein the coated side of the paper carrier is covered with a siliconized release paper as a processing auxiliary carrier.

17. Paper heat-sealing adhesive tape according to claim 15, wherein the paper carrier exhibits a weight of 7-30 g/m².

18. Paper heat-sealing adhesive tape according to claim 15, wherein the paper carrier consists of a transparent, aging-resistant paper with a weight of 8-10 g/m².

* * * * *